April 16, 1963 W. W. GRAY 3,085,430

FLUID FLOW INSTRUMENT

Filed Aug. 29, 1960

Walter W. Gray INVENTOR.

United States Patent Office 3,085,430
Patented Apr. 16, 1963

3,085,430
FLUID FLOW INSTRUMENT
Walter W. Gray, Charlottesville, Va., assignor to Specialties, Incorporated, Syosset, Long Island, N.Y., a corporation
Filed Aug. 29, 1960, Ser. No. 52,483
8 Claims. (Cl. 73—179)

This invention relates generally to fluid flow instruments and particularly to a vertical speed indicator for aircraft.

In testing fluid flow meters or vertical speed indicators of movable vane type I have found that these prior instruments are unreliable in calibration. If they are adjusted or set to give correct indications of vertical speed which is increasing they will often show erroneous vertical speeds when the vertical speeds are decreasing. Likewise, difficulty has been encountered in holding correct calibration over different portions of the vertical speed scale.

An object of the present invention is to provide an instrument which will indicate fluid flow correctly for both increasing and decreasing rates of fluid flow.

Another object is to provide a vertical speed indicator which will indicate accurately the vertical speed of an aircraft whether it is ascending or descending.

A further object is the provision of a fluid flow meter or vertical speed indicator which is accurate over the entire scale of the instrument.

Other objects will be evident in the specification.

Figure 1:
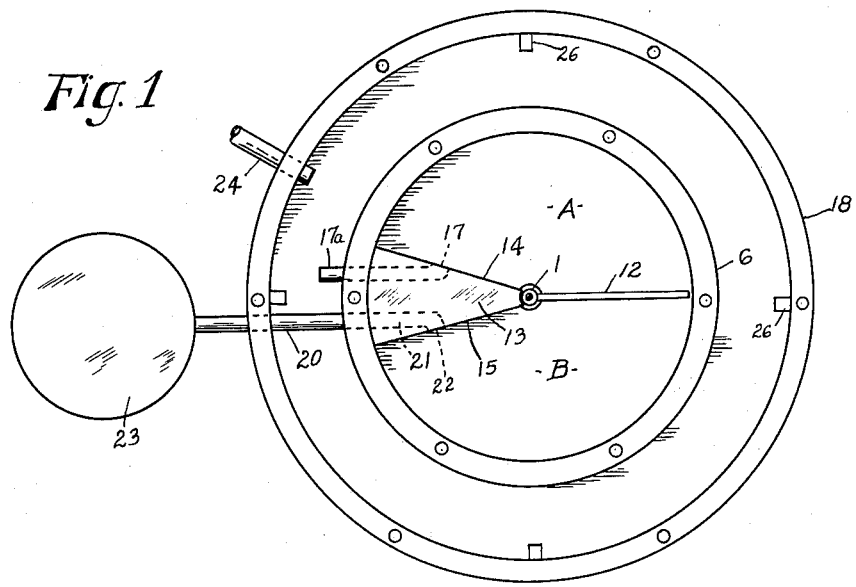
FIGURE 1 is a top plan view of my improved vertical speed indicator or fluid flow instrument with the inner cover plate, torsion spring and pointer removed, and with the fastening ring for the transparent window of the outside container removed.
Figure 2:
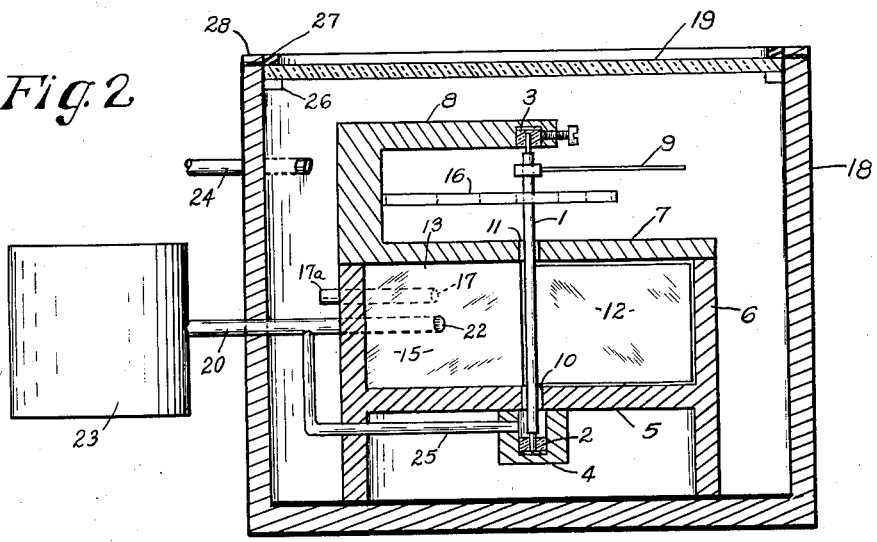
FIGURE 2 is a part sectional elevation of the device of FIGURE 1 but including the spring and pointer, and fastening ring.

In FIGURES 1 and 2, shaft 1 is supported in jewel bearing 2 which is fastened in boss 4 of bottom portion 5 of cylindrical casing member 6 which has attached cover plate 7; and shaft 1 is also supported in bearing 3 supported by arm 8 integral with or attached to cover plate 7. The bearings may be fastened by suitable screws. Bottom element 5 may be integral with cylindrical member 6 or it may be attached thereto by means of screws or the like. These plates may be adjustable in radial directions, with respect to the axis of member 6. Pointer 9 is attached to shaft 1 and is arcuately movable over a scale not shown. This scale can be calibrated in vertical speed or in fluid flow, as desired. It will be assumed that the scale will indicate vertical speed of an aircraft carrying the instrument. Shaft 1 passes through holes or apertures 10 and 11 coaxial with member 6. These holes are, respectively, in plates or members 5 and 7. Member 6 is extended as shown and is supported by the base of casing 18.

Vane 12, which is preferably of light but stiff construction, is attached along an edge thereof to shaft 1 and has three of its edges in close proximity to cylindrical element 6 and members 5 and 7 as indicated. The shaft and this vane can be rotated substantially from one vertical face 14 of wedge-shaped partition 13 to the other vertical face 15 of this partition which serves, in cooperation with vane 12, to divide the space bounded by elements 5, 6 and 7 into two compartments or chambers A and B. Spiral spring 16, attached to arm 8 and to shaft 1, normally holds the shaft and pointer yieldingly in position indicating zero vertical speed.

Port or channel 17 is provided in partition 13 through face 14 thereof and leads into the space defined by housing 18 surrounding casing 5—6—7, through connected tube or conduit 17a. Pointer 9 and associated scale can be observed through sealed glass or clear plastic window 19. Tube or duct 20 is connected with channel 21 in partition 13. This channel leads to port 22 in face 15 of the partition. The other end of tube 20 leads into air reservoir or container 23 which is of suitable size, depending upon dimensions of the instrument and related factors. Static tube 24 leads into housing 18 and its other end opens into the atmosphere surrounding the aircraft.

The holes 10 and 11 are somewhat larger in diameter than the diameter of shaft 1, allowing flow of air in the spaces between the shaft and elements 5 and 7. Tube 25 is connected in a port in boss 4 and connects hole 10 with tube 20 leading into reservoir 23.

In operation, assuming that the device is installed in an aircraft, as the aircraft rises the reduced pressure in tube 24 and chamber A will cause air under higher pressure in reservoir 23 and chamber B to flow around the edges of vane 12 and into chamber A, thereby forcing the vane counter clockwise (FIG. 1) against the tension of spring 16 until a balance between the fluid produced torque and the spring tension is reached. The pointer will then indicate vertical speed in upward direction. If the aircraft then holds its increased altitude the pressures in reservoir 23 and chamber A and tube 24 will become equalized. Conversely if the aircraft descends to a lower altitude the increased atmospheric pressure will cause flow of air through tube 24 and chamber A and past vane 12 to rotate it in clockwise direction against the tension of spring 16, until the pressures in chambers A and B are equal, after there is no further change of altitude. While the aircraft is descending, however, the pointer will indicate vertical speed in downward direction.

The glass disc or other transparent window 19 of container 18 is supported on lugs 26 projecting from the inner cylindrical wall of the container and silicone, rubber or other gasket 27 may be pressed against the disc 19 by means of ring 28 fastened to the edge of container 18 by means of screws.

In prior instruments of the general type described there has been difficulty in calibrating the instruments to indicate correct vertical speed for both ascending and descending conditions. Other discrepancies have also been observed in previous instruments which have had holes similar to opening 11 but they have not included opening 10 connected with tube 25 which is connected with tube 20 and reservoir 23.

Analysis of prior instruments shows that leakage of air to or from chamber A, through the net area of hole 11, will not be through a constant area but this area will in effect constantly increase as vane 12 is rotated clockwise from partition face 14. This varied leakage path, providing no torque on the vane, has therefore produced errors in calibration. In these prior instruments there has been no flow of air through opening 10 since the bearing 2 has acted as a seal.

In my improved vertical speed indicator or fluid flow meter, as depicted in the drawings, I overcome the above difficulties by providing a self-adjusting or balancing leakage path, since, as vane 12 is rotated to increase the volume of chamber A and so to increase the net leakage area of passage 11, the net leakage area of passage 10 leading to reservoir 23 is simultaneously decreased, and approximately in the same proportion. Therefore the net leakage area between chamber A and reservoir 23, which leakage provides no torque, remains substantially constant and the instrument can be calibrated to provide correct vertical speed or fluid flow indications over the entire scale. It will be seen that the leakage is also selfbalancing for rotation of the vane and pointer in counter clockwise direction as seen in FIGURE 1.

The novel principle which I have described makes possible aircraft vertical speed indicators and fluid flow meters of greater reliability and accuracy than prior devices made for the same purpose.

What I claim is:

1. In a fluid flow instrument, a shaft, a pair of bearings supporting said shaft for rotation, a vane attached to said shaft, housing means enclosing said vane and having a partition which together with said vane separates the interior space of said housing means into two compartments, said housing means having a pair of substantially parallel plates having aligned apertures therein in which said shaft is rotatable and permitting air flow through said apertures, means for supplying fluid to one said compartment, fluid reservoir means connected with the other said compartment, and conduit means directly connecting one of said apertures with said reservoir means.

2. The instrument as described in claim 1, and including resilient means for urging said shaft toward predetermined position, and indicator means carried by said shaft.

3. The instrument as described in claim 1, and including a container enclosing said housing, said container having an opening leading to atmosphere.

4. In a vertical speed indicator for aircraft, a shaft, a housing having two substantially parallel spaced plates and a member joining said plates and having the major portion of its interior surface of cylindrical curvature about the axis thereof, each said plate having an aperture coaxial with said axis, a shaft passing through said apertures and rotatable therein, a pair of bearings displaced from said apertures and supporting said shaft for rotation, a vane attached to said shaft and rotatable in said housing and in close proximity to said plates and said member, partition means separating the interior space of said housing into a first compartment and a second compartment limited by said partition means and said vane, a reservoir for air, conduit means connecting said second compartment with said reservoir, conduit means connecting said first compartment with the atmosphere, and conduit means directly connecting one of said apertures with said reservoir, the connection being made adjacent the outside surface of one said plate.

5. The indicator as described in claim 4, and including means urging said shaft toward predetermined position, and means carried by said shaft for indicating vertical speed of said aircraft.

6. The indicator as described in claim 4, the means connecting said first compartment with the atmosphere including a container around said housing.

7. In a vertical speed indicator for aircraft, a housing having a generally cylindrical inner surface, opposed walls of said housing having coaxial apertures therein, a shaft passing through said apertures and rotatable therein, a vane attached to said shaft and rotatable through an angle in said housing and in close proximity to inner surfaces thereof, a partition within said housing cooperating with said vane to divide the interior space of said housing into first and second compartments, a pair of bearings spaced from said apertures and supporting said shaft for rotation, a container enclosing said housing and having a port leading to the atmosphere, air reservoir means connected with the second said compartment, said first compartment having a port leading to the interior of said container, one of said apertures being connected with the interior of said container, conduit means directly connecting the other said aperture with said air reservoir means, yielding means urging said shaft toward predetermined position, and means carried by said shaft for indicating vertical speed of said aircraft.

8. The indicator as described in claim 7, said air reservoir means including a conduit connecting with said second compartment adjacent one face of said partition, and said first compartment port being connected with said first compartment adjacent another face of said partition.

References Cited in the file of this patent

UNITED STATES PATENTS

| | | |
|---|---|---|
| 2,056,354 | Horn | Oct. 6, 1936 |
| 2,355,694 | Ardelt | Aug. 15, 1944 |
| 2,385,901 | Williams | Oct. 2, 1945 |